(12) United States Patent
Punkka

(10) Patent No.: US 7,821,875 B2
(45) Date of Patent: Oct. 26, 2010

(54) DAYLIGHT SAVING TIME SUPPORT FOR MOBILE DEVICES

(75) Inventor: Veikko Punkka, Tampere (FI)

(73) Assignee: Nokia Corporation, Espoo (FI)

( * ) Notice: Subject to any disclaimer, the term of this patent is extended or adjusted under 35 U.S.C. 154(b) by 422 days.

(21) Appl. No.: 10/884,625

(22) Filed: Jul. 1, 2004

(65) Prior Publication Data

US 2006/0002236 A1    Jan. 5, 2006

(51) Int. Cl.
G04B 19/22      (2006.01)
G04B 19/24      (2006.01)
G04C 11/02      (2006.01)
H04W 24/00      (2009.01)
H04M 1/00       (2006.01)

(52) U.S. Cl. .............. 368/21; 368/29; 455/456.1; 455/556.1; 705/8; 705/9

(58) Field of Classification Search ............. 368/21, 368/22, 23, 28, 10, 29, 46, 47; 705/8, 9; 455/456.1, 556.1
See application file for complete search history.

(56) References Cited

U.S. PATENT DOCUMENTS

| | | | | |
|---|---|---|---|---|
| 5,448,532 | A | | 9/1995 | Kataoka et al. ............ 368/10 |
| 5,845,257 | A | * | 12/1998 | Fu et al. ................... 705/8 |
| 5,960,406 | A | | 9/1999 | Rasansky et al. ............ 705/9 |
| 6,198,696 | B1 | | 3/2001 | Korpi et al. ............... 368/21 |
| 6,208,996 | B1 | | 3/2001 | Ben-Shachar et al. ....... 707/104 |
| 6,587,398 | B1 | | 7/2003 | Mock et al. ............... 368/21 |
| 6,728,533 | B2 | | 4/2004 | Ishii ..................... 455/425 |
| 6,856,962 | B2 | | 2/2005 | Yonemitsu |
| 6,950,662 | B2 | | 9/2005 | Kumar .................. 455/456.3 |
| 7,082,402 | B2 | | 7/2006 | Conmy et al. ............... 705/8 |
| 7,219,109 | B1 | | 5/2007 | Lapuyade et al. ........... 707/200 |
| 2004/0136274 | A1 | * | 7/2004 | Mohler et al. .............. 368/47 |
| 2004/0204002 | A1 | | 10/2004 | Chen et al. .............. 455/550.1 |
| 2005/0190653 | A1 | * | 9/2005 | Chen ..................... 368/21 |
| 2005/0286347 | A1 | * | 12/2005 | Irino ..................... 368/21 |

FOREIGN PATENT DOCUMENTS

| | | |
|---|---|---|
| CN | 1436020 A | 8/2003 |
| EP | 1227644 A2 | 7/2002 |
| JP | 2002-290515 | 10/2002 |
| WO | WO 95/27927 | 10/1995 |

OTHER PUBLICATIONS

Abstract from SIPO for Publication No. 1436020 Aug. 13, 2003.
Patent Abstracts of Japan, Publication No. 2002-290515, Date of Publication: Oct. 4, 2002.
3GPP ETSI TS 122 042 V6.0.0 (Jan. 2005), Digital cellular telecommunications system (Phase 2 +); Universal Mobile Telecommunications System (UMTS); Network Identity and Time Zone (NITZ) service description; Stage 1 (3GPP TS 22.042 version 6.0.0 Release 6).

* cited by examiner

Primary Examiner—Vit W Miska
(74) Attorney, Agent, or Firm—Ware, Fressola, Van Der Sluys & Adolphson, LLP

(57) ABSTRACT

The invention relates to a method for updating a time marking according to new location, wherein a country related information is detected, a need for time update is determined, and if needed, time rules corresponding to said country related information is retrieved and the time is updated according to said rules. The invention relates also to a system, to a device, to a update converter and to computer program product.

10 Claims, 3 Drawing Sheets

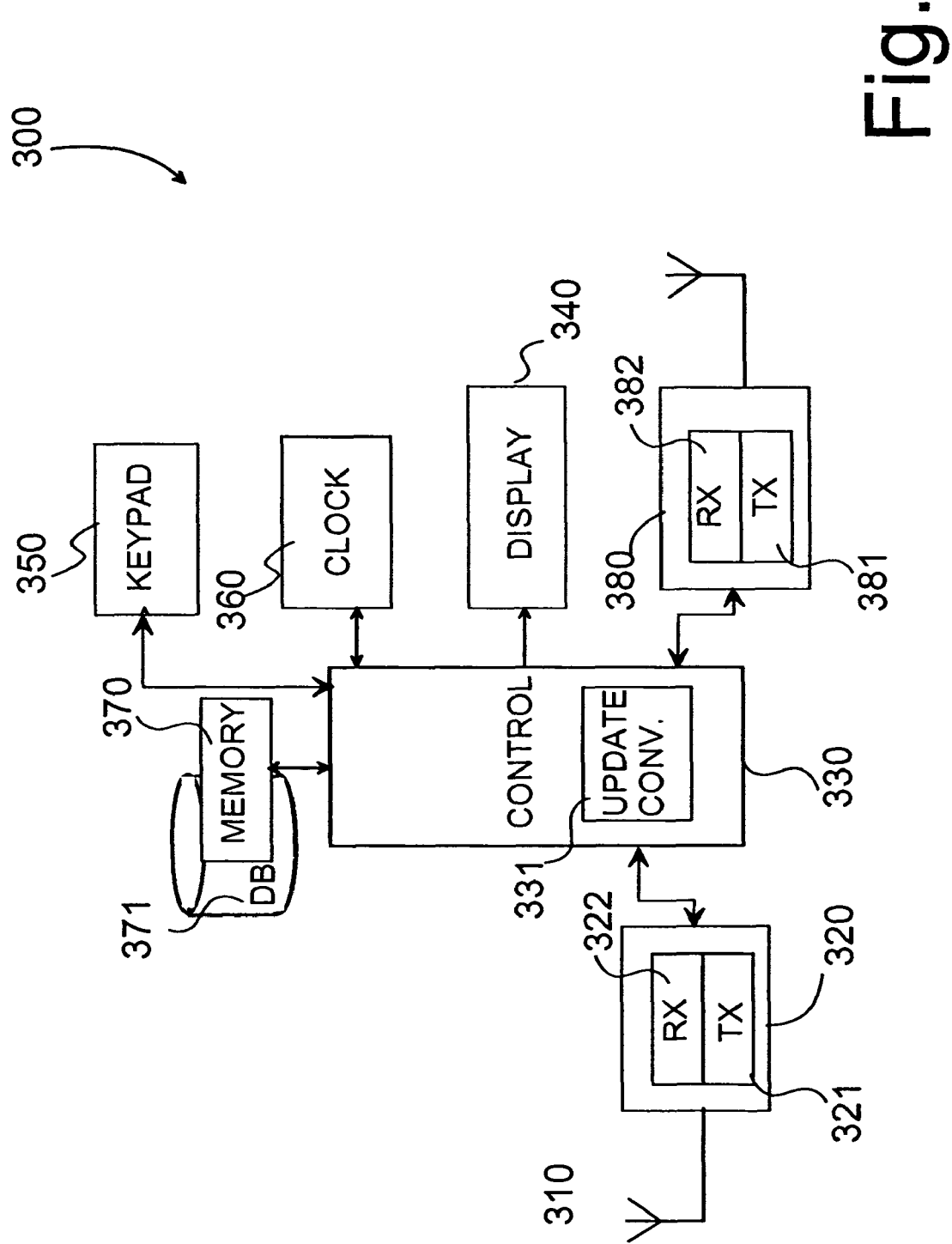

DAYLIGHT SAVING TIME SUPPORT FOR MOBILE DEVICES

FIELD OF THE INVENTION

This invention relates generally to time management and particularly to such time management, wherein time zones and time rules are taken into account, especially, when an electronic device roams from one location to another.

BACKGROUND OF THE INVENTION

Universal Time (abbreviated UT) or Greenwich Mean Time (abbreviated GMT) is generally used when describing time globally. These terms are often used to refer to time kept on the Greenwich meridian (longitude zero). According to Greenwich meridian agreement, the earth is divided into 24 time segments, time zones, each of which takes ¹⁄₂₄ of the day. In the most common civil usage, UT refers to a time scale called "Universal Time Coordinated" (abbreviated UTC).

In connection to civil time, the Daylight Saving Time, DST, (or Summer Time as it is called in many countries) is introduced. DST is a way of getting more from summer days by advancing the clocks typically one hour during the summer. According to this, the sunset and sunrise are later than during normal time (i.e. winter time, standard time of the country in question). DST helps to save energy (less artificial light is needed during the evening) and to make the country more effective in addition to the pleasing effect of lighter evenings. The utilization of DST comprises adjusting the clocks typically one hour ahead when DST begins (during spring), and adjusting them back to standard time every autumn.

Approximately 70 countries utilize DST at least in a portion of the country. Japan is the only major industrialized country that has not adopted daylight saving. European nations have taken advantage of the time change for a long time and currently "summertime period" is standardized in the EU. EU's Daylight Saving Time runs from the last Sunday of March through the last Sunday in October.

For an example Moscow's standard time (UTC+3) is about a half-hour ahead of local mean time (UTC+2:30), which local mean time is the actual time in a given location based upon the Sun's position at the Midheaven (noon) of the place. This is about the same situation as in Detroit, where the standard time (UTC−5) is also about half-hour ahead of the local mean time (UTC−5:30). With their latitudes and with the relationship of their standard time to the local mean time the DST really helps to save daylight. In the Southern Hemisphere, where summer comes in December, DST is typically observed from October to March.

Equatorial and tropical countries (lower latitudes) do not observe DST since the daylight hours are similar during every season. This is why there is no advantage of moving clocks forward during the summer. China has had a single time zone since May 1, 1980 observing summer DST from 1986 through 1991, but currently they do not.

Most countries that observe daylight saving time are listed in the table below. Almost all of them save one hour in the summer and change their clocks some time between midnight and 3 am. Countries with "*" may have some specialities, which should be checked from national law.

| Continent | Country | Beginning and ending days |
|---|---|---|
| Africa | Egypt | Start: Last Friday in April<br>End: Last Thursday in September |
|  | Namibia | Start: First Sunday in September<br>End: First Sunday in April |
| Asia | Most states of the former USSR. | Start: Last Sunday in March<br>End: Last Sunday in October |
|  | Iraq | Start: April 1<br>End: October 1 |
|  | Israel | (Estimate, Israel decides the dates every year)<br>Start: First Friday in April<br>End: First Friday in September |
|  | Lebanon, Kyrgyzstan | Start: Last Sunday in March<br>End: Last Sunday in October |
|  | Mongolia | Stopped in 2002 |
|  | Palestine | (Estimate)<br>Start: First Friday on or after 15 April<br>End: First Friday on or after 15 October |
|  | Syria | Start: April 1<br>End: October 1 |
|  | Iran | Start: the first day of Farvardin<br>End: the first day of Mehr |
| Australia | South-Australia, Victoria, Australian Capital Territory, New South Wales, Lord Howe Island (saves half an hour) | Start: Last Sunday in October<br>End: Last Sunday in March |
|  | Australia—Tasmania | Start: First Sunday in October<br>End: Last Sunday in March |
|  | Fiji | Stopped in 2000 |
|  | New Zealand, Chatham* | Start: First Sunday in October<br>End: Third Sunday in March |
|  | Tonga | Start: First Sunday in November<br>End: Last Sunday in January |
| Europe | European Union*, UK* | Start: Last Sunday in March at 1 am UTC<br>End: Last Sunday in October at 1 am UTC |
|  | Russia | Start: Last Sunday in March at 2 am local time<br>End: Last Sunday in October at 2 am local time |
| North America | US*, Canada, Mexico St. Johns, Bahamas, Turks and Caicos | Start: First Sunday in April<br>End: Last Sunday in October |
|  | Cuba | Start: April 1<br>End: Last Sunday in October |
|  | Greenland | Same as EU |
| South America | Brazil (rules vary from year to year) equatorial Brazil does not observe DST. | Start: First Sunday in November<br>End: Third Sunday in February |
|  | Chile* | Start: Second Saturday of October at midnight<br>End: Second Saturday of March at midnight |
|  | Falklands | Start: First Sunday on or after 8 September<br>End: First Sunday on or after 6 April |
|  | Paraguay | Start: First Sunday in September<br>End: First Sunday in April |
| Antarctica | Antarctica | (varies) |

It can be clearly seen from the table above that there are many oddities in countries. For example some parts of the US and Canada do not observe DST, such as the state of Arizona (US) and the province of Saskatchewan (Canada). The observance can also be erratic. For example Chile delayed its changeover date for the Pope's visit in 1987 and a presidential inauguration in 1990.

In Japan, DST was introduced after World War II by the US occupation but was dispensed with in 1952 following opposition from farmers. Despite efforts by the Ministry of International Trade and Industry to have daylight saving introduced to cut Japan's energy consumption, opposition from farmers and the Ministry of Education maintains the situation.

Time zones will become important to people e.g. when travelling. Travellers need to know the time of the destination, according to which they are required to change the time from the country of departure (home country). Often the new time is informed to the traveller, whereby he/she can change the time of his/her watch. Similarly, when contacting another person abroad, the time of the country in question should be known for not disturbing the person e.g. during the night.

The time of electronic systems can be handled by means of a network. Personal computers or other fixed network devices need more information about the daylight saving time than about the time zone. However the use of portable electronic devices is constantly increasing as well as use of them in different countries. According to the characteristics of the devices, the devices can move from one location to another, which locations can also situate in different time zones. Currently movable devices utilize a mobile network, and by means of NITZ messages (Network Identity and Time Zone) received from the network, their time can be updated automatically. The NITZ informs the mobile device about a country code and the time zone, according to which the time in the mobile device can be updated.

The system time e.g. in Symbian based devices or Unix based devices runs in UTC. Due to this, the time is not changed by the change of the location or the start or the end of DST. The time presented to the user in the mobile terminal (referred as "home time") takes into account the time zone and the possible DST. The events and marks in the mobile terminal are shown to the user in that time. In order to show the current home time correctly, the terminal's local information includes the universal time offset of the time zone and the information about the state of DST. When the user deals with future dates and times, the system does not know the state of the DST, and hence cannot deduce the correct UTC time for the home time given by the user. Also, when the user receives an event described in home time, the event is also stored as home time. Because the system cannot deduce the correct UTC time for the event, the event won't be in UTC time. The user may define which operations are implemented when the device moves from one time zone to another. The user may set on the automatic update of time and time zone (acquired by NITZ) whereby the time zone of the device is updated. The user may also update the time zone manually or the user may adjust the time of the device without adjusting the time zone. However, in all those cases the system will show the future events in the old home time, not in the new home time, and any alarms tied to these events will be launched at the wrong time.

A solution for solving the problem relating to time management of mobile phones is proposed by Sharp Laboratories of America. Their publication U.S. 2002/98857 A1 suggests a method wherein the clock of the mobile terminal synchronizes itself with a base station in any location, whereby the base station transmits a control signal including a UTC signal, a system identification signal, a network identification signal, a current local time signal and a DST flag. A selection mechanism is arranged into the clock by means of which the user can select a home time zone and to select a displayed time on the clock display from the group of displayed times consisting of current local time and home time zone. In addition the clock comprises a displayed time calculating mechanism that determines the time displayed on the clock display as a function of the current local time and home time zone.

The main defect in the related art is the one described earlier, a lack of a suitable method and a system according to which the updated time would reach the stored events, and update them as well. This kind of solution would be highly profitable, especially for those users who travel frequently and are tied to calendar and time.

SUMMARY OF THE INVENTION

The proposed solution according to this invention is aimed to overcome the defects of related art.

That is why in the method according to the invention for updating a time marking according to new location, a country related information is detected, a need for a time update is determined, and if needed, time rules corresponding to said country related information is retrieved and the time is updated according to said time rules.

A device according to the invention comprises time measuring means, an update converter for updating the time, the update converter being configured to detect a country related information and to determine a need for a time update, whereby the update converter is further configured to acquire time rules corresponding to said country, and further to update the time according to said time rules, if needed.

A system for a time update according to the invention comprises a network for providing country related time information, a movable device communicating with said network, time measuring means being arranged into said movable device, an update converter for updating the time in the movable device, a database for storing country specific time rules, whereby the update converter is configured to detect country related information and to determine a need for the time update, whereby the update converter is further configured to acquire the time rules corresponding to said country and according to the time rules to update the time in the movable device, if needed.

Further, an update converter for a time update comprises first means for detecting country related time information and second means for determining a need for a time update, third means for acquiring time rules corresponding to said country, whereby the update converter is configured to update the time according to the time rules, if needed.

A computer program product according to the invention comprises computer readable instructions for detecting a country related information and instructions for determining a need for a time update, whereby the computer program product comprises instructions for acquiring time rules corresponding to said country, and instructions for updating a time according to said time rules, if needed.

The solution according to the invention enables the user to move between time zones and the daylight saving time can be updated. The events that are entered by the user, received or stored in the user's device will be shown correctly in current local time. Similarly the alarms in connection to said events will operate at the correct time, i.e. the time of the location where the user is. The invention has considerable advantages compared to the related art and further advantages can be read from the description that follows.

DESCRIPTION OF THE DRAWINGS

The invention is described in more detailed manner by means of following drawings, wherein

FIG. 3 illustrates an example of a device according to the invention.

DETAILED DESCRIPTION OF THE INVENTION

Figure 1:
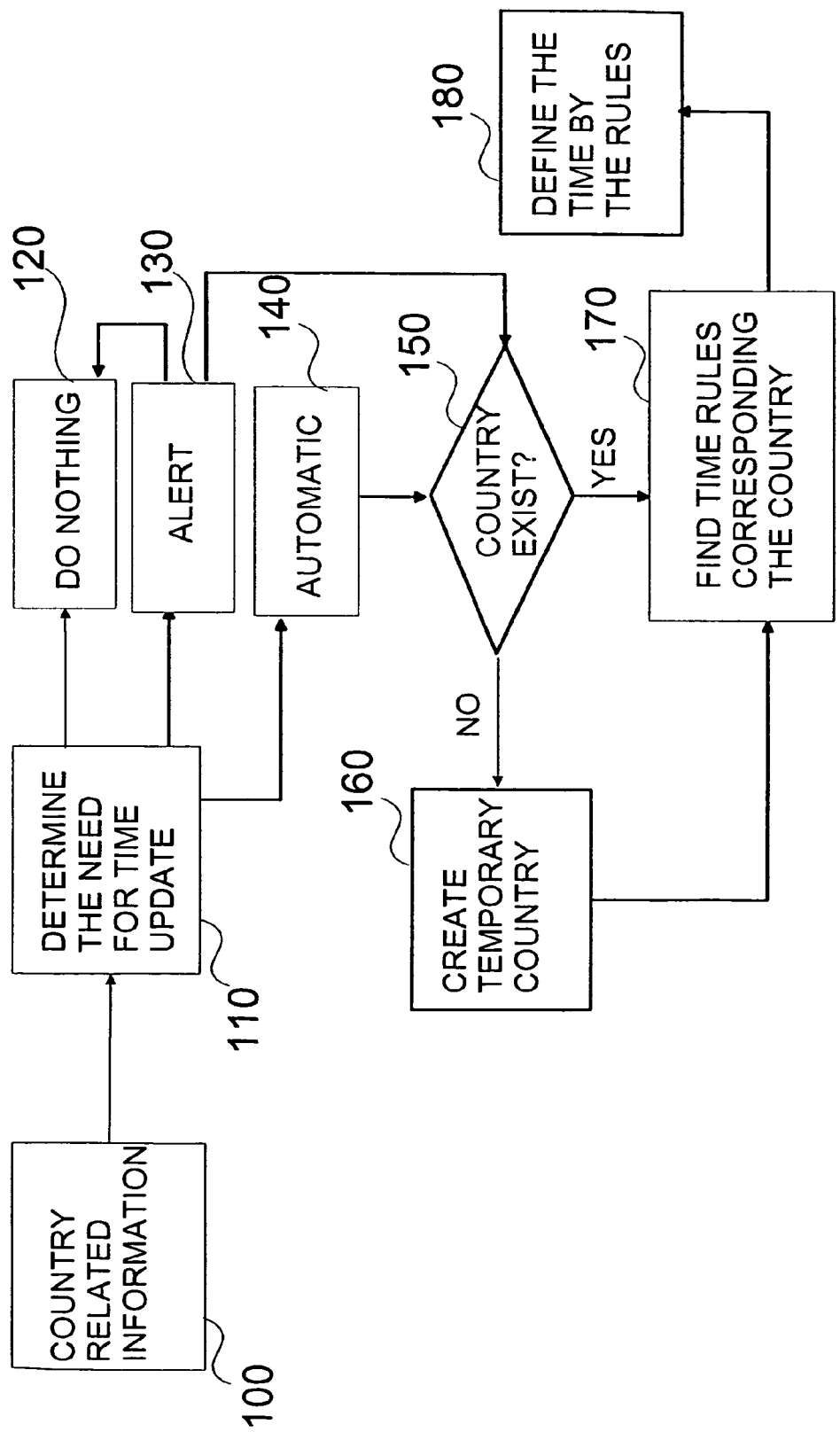
FIG. 1 illustrates in a simplified manner the steps of one embodiment of the method according to the invention.

The invention is described in a more detailed manner first by means of an implementation and after by means of few use examples. The device that utilizes the solution is in the description a Nokia 9500 Communicator. It will be, however, appreciated that the device can be some other device, which is movable and which has means for network connection and which comprises a clock or is somehow connected to one. Other examples are a mobile phone, a PDA device, a laptop etc.

The main idea according to the invention is to deduce the start and end dates of daylight saving time (DST) from the home city. The time of the home city is the time of the city the user usually is located in. The "current time", which may change according to moving of the user, is acquired from a network for the country in question. The current time is updateable when the user moves to a city with different DST calculation rules. The method is described further by means of FIG. 1, but before that, an example of the device according to the invention is described and illustrated in FIG. 3.

The device 300 comprises a time measuring means, e.g. clock 360 and display 340 for displaying visual information e.g. the time. Further the device 300 comprises a database 371 (arranged into the memory 370) that stores the cities and corresponding time zones and DST calculating rules. The memory 370 may store other data, programs etc. as well. The database is updated according to the relationships of cities to time zones and to start and end dates of DST. The database can be preconfigured with the country/city list, which can be updated by a user, but naturally the whole list can be inserted by the user according to his/her interests. The user can use e.g. a keypad 350 for entering data to the database. By means of the keypad 350 the user can enter data or control the device 300.

The device 300 comprises also a control unit 330 for controlling functions in the device 300. The control unit 330 may comprise one or more processors (CPU, DSP). The device 300 comprises an update converter 331 that is configured to implement the updating or resetting the time and may for instance be arranged into the control unit 330 as shown.

The time zone and the status of DST of the current city can be acquired from an update message that describes the time information of the city. This kind of update message can be a NITZ message that informs about the current network and the current time zone. The home city is updated, when an update message with a different time zone is received. The update message can be received via a network by means of a communication means 320 having a transmitter 321 and a receiver 322. There can be also other communicating means 380 having a transmitter 381 and a receiver 382 arranged into the device 300. The first communicating means 320 can be adapted for telecommunication and the other communicating means 380 can be a one kind of short-range communicating means, such as Bluetooth™ system, WLAN system (Wireless Local Area Network) or other system which is suited for local use and for communicating with another device.

The device 300 can also comprise other means, such as audio means, including an earphone and a microphone and optionally a codec for coding (and decoding, if needed) the audio information. Further the device 300 can operate also with location/positioning systems, e.g. a GPS.

Referring now to FIG. 1, there is shown an instance of when the update converter receives (100) an update message from the network, which update message is e.g. a NITZ message, with current time information. The update converter can also detect a country related information, e.g. by user input. When noticing a new time information message the converter is configured to decide (110), which operations it is supposed to do. The update converter can be programmed to neglect the update message and do nothing (120) if the current time zone remains or if the user does not want the updating. The update converter can also alert (130) the user and give the user a possibility to update the time and update the current city from a list of cities within the current country with the current time zone (both can be deduced from the message) or ignore the update. The update converter can also operate automatically (140) to update the time and, if the time zone changes or the DST status changes unexpectedly, also to update the home city (and hence time zone of the device). The update of home city can be requested, when the update message with the same time zone but an unexpected change in DST is received. The DST calculation rules of all the cities in a country can be updated when the country changes its DST calculation rules.

If the user has chosen the automatic update for the home city from the update message and other location data is available that uniquely determines (150) the city within the set of known cities with the correct country and time zone, the home city can be updated to that city. The location can be determined by the area code or known positioning systems, e.g. GPS. If there is no unique city, the update converter may create a temporary city (160) based on the known location information, choose the last visited city that matches the location information or choose a default city that matches the location information and update that to be the current home city. The user can change the home city manually if he/she so wishes. After having determined the current country or city the corresponding time rules are fetched from the database (170). The time rules may be time zone and daylight saving time calculation rules for the country/city in question.

When new location information with new time definitions is acquired, the converter is configured to determine times for the events being stored in the device (180). There is no need to specify the events, because an event can be any event which can be measured by time. As an example, the events can be e.g. a calendar event, a task, an alarm, but it is understood that the event can be another type of event relating to time.

Figure 2:
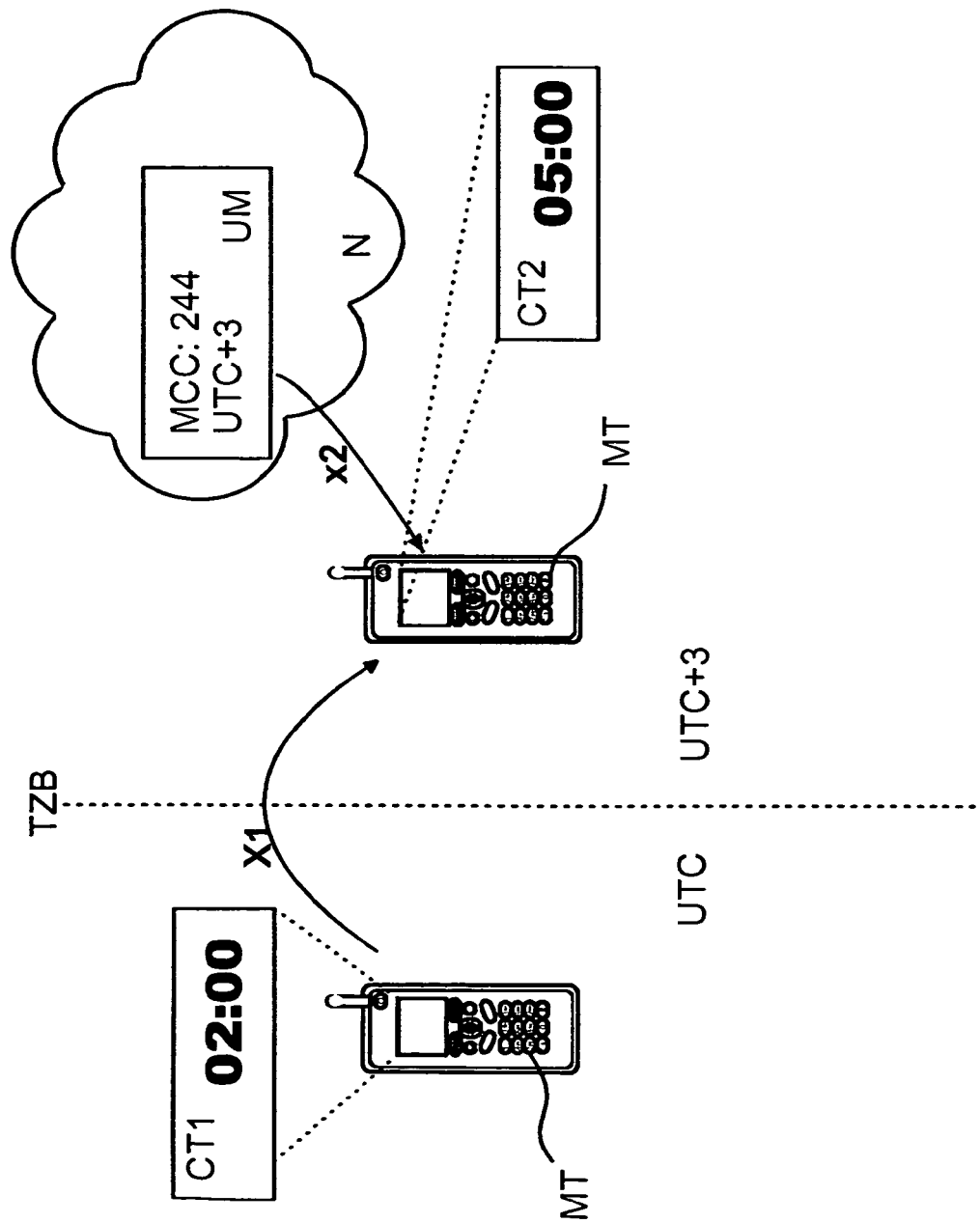
FIG. 2 illustrates an example of one use case.

The operation is also illustrated in FIG. 2, wherein a mobile terminal (MT) at current time (CT1) moves over (X1) at least one time zone border (TZB), wherein the new current time (CT2) is, according to the situation in FIG. 2, three hours ahead the previous (CT1). In the new time zone the mobile terminal (MT) receives (X2) an update message (UM) from network (N). The mobile terminal (MT) determines the new time for the events being stored in the terminal.

The previous description is clarified with following examples. Four different use cases are assumed, wherein 1) user A is located in London, but moves to New York; 2) user A locates in London, but moves to New York and returns to London again; 3) user A locates in London, user B locates in New York, user C locates in Tokyo and the users are having a telephone conference together.

1) From London to New York

User A lives in London and has home time, which is a local time of London, set to his movable device. He has set calendar events in the local time, although he is aware of going to New York for a meeting. The meeting is marked to the calendar to start on Monday at 12 p.m. However the marking does not take into account where the meeting is held. When user A flies to New York, switches on the movable device, he will get the update message informing about the new time, a local time of New York. User A has chosen the option of automatic update, because he finds that option more usable because of lot of travelling. As a result of the update the marking is maintained on its place (on Monday 12 p.m.) regardless of the time difference and not kept in English local time that would be 5 p.m. On Monday, at 11 a.m. New York time, user A is reminded by an alarm, which was programmed to alarm an hour before the meeting. Although the user had set the meetings in his home country, the change in time zones maintains the marked time according to the visited time zone, therefore the alarm is launched at the "wrong time" compared to London (4 p.m. London time), where the mark was made. The alarming time corresponds to the correct time in the city the user is located in and where the meeting is to be held.

It is possible to program the device to automatically detect the place of stay according to the place code marked into calendar. For example user A could have marked "12 p.m. Meeting NYC", whereby the update converter would automatically keep the time in New York time. Similarly the marking can be displayed in the calendar at hour 12, but with the place code.

User A can be given a possibility for e.g. a scheduled SMS-messaging or other automatic function (e.g. email synchronization). For example, if user A wants to send New Year's Eve wishes from New York City to London, he can determine the SMS message, with an option "Send earliest 00:00 LON", whereby the time is determined by London time, and due to it, is sent at 7 p.m. in New York time. If user A would have sent the SMS according to his current time (time in New York) the message would have reached the recipient 5 hours too late. The automatic conversion is made by the country code, e.g. LON, by the update converter.

2) From London to New York and Again to London

While user A stays in New York his secretary, who resides in London, can send a SMS and add an appointment to user A's calendar that will be held in London on Friday at 3 p.m. The marking is made according to secretary's current time and the appointment is shown to the secretary in 3 p.m. It should be noticed here, that when user A synchronized calendar data with corporate server the appointment is in the same time regardless of his location. When user A returns to London, the update converter transforms the time in such a manner that it maintains the time at 3 p.m. in London time.

Basically the operations for returning time are carried out similarly to the time updating. The update message is received and the updating operations are implemented by the converter.

3) Phone Meeting Between London, New York, Tokyo

In some cases, e.g. in a phone conference between London, New York and Tokyo, the time should be maintained as it is. User C from Tokyo sets up the meeting at 10 a.m. and informs the others to be available at 10 a.m. Tokyo's local time. User A in London is reserved then at 2 a.m. and user B in New York is reserved at 9 p.m. (previous day). Usually the update converter would transform the time to the corresponding (same) time of the country in question, but in this case the actual time of Tokyo is essential. User A and user B have to be aware of the time difference and have their calendar updated according the local time. The update converter is configured to determine which operations the marking would need. There are various ways to instruct the update converter to determine the operations. User C can oblige the marking to remain in Japanese time or users A, B may accept the marking and maintain the Japanese time by leaving it to the corresponding country time.

According to the invention users in different countries can still organize their workdays easily according to the invention.

The above-mentioned examples should be considered as illustrations of the invention, and that is why, other applicable use cases will be appreciated by the man skilled in the art. For example future coming events, such as the starting time of a conference, the lighting time for Olympic fire in a specific country, etc. are such that they can be marked and are correctly shown in the current country when the device is located there. Beside future events, also events and tasks that are occurring in the same day are handled by the current solution. The events like e.g. an alarm clock in every working day, daily reminder (e.g. hour of prayer, time for taking medicine)/weekly (e.g. a language course)/monthly (reading of an electricity meter)/annual (e.g. car inspection), task within following e.g. 12 hours can be handled. Similarly, other possible events are timed profiles, timed switch on—off, back up copying in certain time of the day, other scheduled activities, etc. It will also appreciated that the device can be also another device that operates under time constraints or needs time information and that has roaming capabilities.

It will also be clear that variations and modifications of the examples as well as the implementation described are possible without departing from the scope of protection of the invention as set forth in the claims.

The invention claimed is:

1. A method for updating a time marking in a portable electronic device, comprising:
   automatically detecting a location for at least one event stored in the portable electronic device based at least on a place code for the location associated with the at least one event, wherein the at least one event comprises a start time,
   two-way communicating with a network in order to obtain city related information for a current city in which the portable electronic device is currently located,
   determining, based on the city related information and on the location for the at least one event, whether there is a need for a time update in the portable electronic device with respect to the start time for the at least one event stored in the portable electronic device for the current city;
   automatically retrieving, in response to a determined need for a time update, city specific time rules from a database, wherein the time rules corresponding to said city related information comprise calculation rules and a start date and an end date of daylight saving time for the current city; and
   updating at least the start time for the at least one event stored in said portable electronic device according to said time rules.

2. The method according to claim 1, wherein the city related information comprises at least information about one of the following; a code for the city, a time zone for the city.

3. The method according to claim 1, wherein the time is updated for said at least one event stored in the portable electronic device, because of a movement of the portable electronic device from one location to another.

4. The method according to claim 1, wherein the time is updated for said at least one event stored in the portable electronic device according to a location or locations of at least one other device.

5. The method according to claim 3, wherein said at least one event is at least one of the following: a calendar event, a task, an alarm, a clock.

6. The method according to claim 1, wherein the time is updated in the portable electronic device after moving into said current city.

7. The method according to claim 4, wherein said at least one event is at least one of the following: a calendar event, a task, an alarm, a clock.

8. An apparatus, comprising:
a time update converter configured to automatically detect a location for at least one even stored in the apparatus based at least on a place code for the location associated with the at least one event, wherein the at least one event comprises a start time;
a communication device configured to communicate with a network in order to obtain city related information for a current city in which the apparatus is located;
a control module configured to determine based on the city related information and on the location for the at least one event, whether there is a need for a time update with respect to the start time for the at least one event stored in the apparatus for the current city,
and in response to a determined need for a time update, said control module is configured to provide instructions to automatically retrieve city specific time rules corresponding to the city related information stored in the apparatus, wherein said time rules comprise calculation rules and a start date and an end date for daylight saving time for the currently city; and
an update module configured to update at least the start time for the at least one event stored in said apparatus according to the time rules.

9. A computer readable medium storing computer program instructions that, when run on a processor of an electronic device, perform:
automatically detecting a location for at least one event stored in the electronic device based at least on a place code for the location associated with the at least one event, wherein the at least one event comprises a start time,
two-way communicating with a network in order to obtain city related information for a current city in which the electronic device is located;
determining, based on the city related information and on the location for the at least one event, whether there is a need for a time update with respect to the start time for the at least one event stored in the electronic device for the current city and, in response to a determined need for a time update,
retrieving, in response to a determined need for a time update, city specific time rules, wherein the time rules corresponding to said city related information comprise calculation rules and a start date and an end date for daylight saving time for the current city, and
updating at least the start time for the at least one event stored in said electronic device according to the time rules.

10. An apparatus, comprising:
a time update converter configured to automatically detect a location for at least one event stored in the apparatus based at least on a place code for the location associated with the at least one event, wherein the at least one event comprises a start time;
a time indicator, configured to indicate a time related to a current city in which the apparatus is located;
a communication module, comprising a receiver and a transmitter, and configured to communicate with a network in order to obtain city related information for the current city;
an alerting module, configured to alert a user of a possibility of whether a daylight saving time update of the start time for the at least one event stored in the apparatus is wanted in the current city based on city specific time rules comprising calculation rules and a start date and an end date for daylight saving time for the current city; and
an inputting module, configured to indicate the daylight saving time update of the start time for the at least one event stored in the apparatus is wanted or not.

* * * * *

UNITED STATES PATENT AND TRADEMARK OFFICE
CERTIFICATE OF CORRECTION

| | | |
|---|---|---|
| PATENT NO. | : 7,821,875 B2 | Page 1 of 1 |
| APPLICATION NO. | : 10/884625 | |
| DATED | : October 26, 2010 | |
| INVENTOR(S) | : Veikko Punkka | |

It is certified that error appears in the above-identified patent and that said Letters Patent is hereby corrected as shown below:

In column 9, line 12, which is claim 8, line 3, "even" should be --event--.

In column 9, line 30, which is claim 8, line 21, "currently" should be --current--.

Signed and Sealed this
Twenty-second Day of February, 2011

David J. Kappos
*Director of the United States Patent and Trademark Office*